United States Patent
Foltin

(10) Patent No.: US 9,409,511 B2
(45) Date of Patent: Aug. 9, 2016

(54) METHOD AND DEVICE FOR CONTROLLING AT LEAST ONE HEADLIGHT OF A VEHICLE

(71) Applicant: Robert Bosch GmbH, Stuttgart (DE)

(72) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/457,986

(22) Filed: Aug. 12, 2014

(65) Prior Publication Data

US 2015/0048736 A1   Feb. 19, 2015

(30) Foreign Application Priority Data

Aug. 15, 2013 (DE) .......................... 10 2013 216 225

(51) Int. Cl.
*B60Q 1/14* (2006.01)

(52) U.S. Cl.
CPC .............. *B60Q 1/1423* (2013.01); *B60Q 1/143* (2013.01); *B60Q 2300/052* (2013.01); *B60Q 2300/314* (2013.01); *B60Q 2300/42* (2013.01)

(58) Field of Classification Search
CPC ........ B60Q 1/14; B60Q 1/1423; B60Q 1/143; B60Q 2300/052; B60Q 2300/314; B60Q 2300/42

USPC ...................................................... 315/77, 82
See application file for complete search history.

(56) References Cited

U.S. PATENT DOCUMENTS

| | | | |
|---|---|---|---|
| 7,825,600 B2 * | 11/2010 | Stam ...................... | B60Q 1/085 315/82 |
| 2010/0271195 A1 * | 10/2010 | Biondo ................ | B60Q 1/1423 340/463 |

* cited by examiner

*Primary Examiner* — Jimmy Vu
(74) *Attorney, Agent, or Firm* — Norton Rose Fulbright US LLP

(57) ABSTRACT

A method for controlling at least one headlight of a vehicle, in which the at least one headlight has first and second emission characteristics for illuminating the surroundings of the vehicle. The reading in of a first brightness signal initially occurs. In this case, the first brightness signal represents a first brightness, which is assigned to the first emission characteristic, of the surroundings of the vehicle. Subsequently, the receiving of a second brightness signal occurs. The second brightness signal represents a second brightness, which is assigned to the second emission characteristic, of the surroundings of the vehicle. In a further task, a brightness deviation is ascertained between the first and the second brightnesses by using the first and the second brightness signals. Finally, the setting of a debouncing time occurs for changing from the first emission characteristic to the second emission characteristic as a function of the brightness deviation.

10 Claims, 3 Drawing Sheets

METHOD AND DEVICE FOR CONTROLLING AT LEAST ONE HEADLIGHT OF A VEHICLE

RELATED APPLICATION INFORMATION

The present application claims priority to and the benefit of German patent application no. 10 2013 216 225.1, which was filed in Germany on Aug. 15, 2013, the disclosure of which is incorporated herein by reference.

FIELD OF THE INVENTION

The present invention relates to a method for controlling at least one headlight of a vehicle, to a corresponding device, and to a corresponding computer program product.

BACKGROUND INFORMATION

High beam assistants for a vehicle may control a visibility range of a driver in such a way that a blinding of other road users is avoided. This type of high beam assistants may have a certain debouncing time. By using the debouncing time, turning up a headlight may be delayed, for example. The debouncing time may be a function of situations such as a convoy of vehicles, a single vehicle, a passing maneuver and/or a velocity of the vehicle. In the case of a higher velocity, a shorter debouncing time may be set so that the headlights are turned up at an earlier point in time. Furthermore, turning up the headlights may be controlled by using predefined debouncing times. In order to define the debouncing time, a switching frequency of the headlight may be evaluated, for example.

SUMMARY OF THE INVENTION

Against this background, the present invention provides an improved method and an improved device for controlling at least one headlight of a vehicle, as well as a corresponding computer program product according to the main descriptions herein.

Advantageous embodiments result from the particular subdescriptions and the following.

The human eye is able to adapt to a brightness of its surroundings. Accordingly, the human eye continuously adapts to the changing lighting conditions during switching between a low beam and a high beam or between corresponding intermediate stages, for example. Such a switchover may, however, bother the driver. In particular, in the case of great brightness differences in a visual field of the driver, the discomfort perceived by the driver may be quite pronounced, somewhat comparable to accidentally switching to high beams during fog, for example.

A headlight of a vehicle may have two brightness stages, e.g., the low beam and the high beam. A comfort perception of a driver with regard to a contrast change caused by a switchover from the one to the other brightness stage may be influenced by a time delay of the switchover. In order to improve the comfort perception of the driver, this time delay, which is also referred to as debouncing time, may be advantageously adapted to a brightness difference between the two brightness stages. The brightness difference may be ascertained by detecting a particular brightness of the two brightness stages and by comparing the particular brightnesses to one another. The debouncing time may be set as a function of the ascertained brightness difference. In this way, a visibility range of the driver may be improved and a comfort of the driver may be increased.

A method for controlling at least one headlight of a vehicle is provided, the at least one headlight having a first and a second emission characteristic for illuminating the surroundings of the vehicle. The method includes the following tasks:

reading in a first brightness signal, the first brightness signal representing a first brightness, which is assigned to the first emission characteristic, of the surroundings of the vehicle;

receiving a second brightness signal, the second brightness signal representing a second brightness, which is assigned to the second emission characteristic, of the surroundings of the vehicle;

ascertaining a brightness deviation between the first and the second brightnesses by using the first and the second brightness signals; and setting a debouncing time for changing from the first to the second emission characteristic as a function of the brightness deviation.

The at least one headlight may, for example, be a front light of the vehicle. An emission characteristic may, for example, be understood to mean a brightness or an emission angle and/or a headlight distribution of the at least one headlight. The first emission characteristic may, for example, have a lower illumination intensity or illumination range of the at least one headlight than the second emission characteristic. For example, the first emission characteristic may correspond to a low beam and the second emission characteristic may correspond to a high beam of the vehicle. In this case, the at least one headlight may be switched over from the first to the second emission characteristic or from the second to the first emission characteristic. The surroundings of the vehicle may be, for example, an illuminated area ahead of the vehicle or a visibility range of a driver. A size of the surroundings may be a function of the emission characteristics and of the reflection properties of the surroundings.

A varying brightness of the illuminated surroundings of the vehicle may be detected by using at least one brightness signal. A first brightness signal may be understood to mean a signal which represents a first brightness of the surroundings which is assigned to the first emission characteristic. A second brightness signal may be understood to mean a signal which represents a second brightness of the surroundings which is assigned to the second emission characteristic. The first and the second brightnesses may be a function of a headlight distribution and headlight intensity of the emission characteristics and of the reflective objects in the surroundings of the vehicle. Such objects may, for example, be road surfaces, slopes, guardrails, posts, walls, buildings, bridges, or ground vegetation of shrubs or trees. Strongly reflective elements, such as road markings, guide posts, and traffic signs, in particular, may influence the first and the second brightnesses.

The first and the second brightness signals may be combined with one another. This may be carried out by using a logic unit, e.g., a processor of a control device of the vehicle. In this case, a brightness deviation between the first and the second brightnesses may be ascertained. A brightness deviation may, for example, be a ratio or a difference between the first and the second brightnesses. For example, the second brightness may be twice as bright as the first brightness, or the first brightness and the second brightness may deviate by a certain value from one another which represents, for example, a luminous flux or an illumination intensity of an emission area of the at least one headlight.

A debouncing time may be set as a function of the brightness deviation. A debouncing time may generally be understood to mean a period of time by which a transduction of a signal to a control device, e.g., for controlling the at least one headlight, may be delayed. In this case, the control device may have a debounce counter which is started upon the first occurrence of the signal and increased at regular intervals as long as the signal is present. Only when a predefined threshold value is exceeded, is the signal not interpreted as an interference and further processed by the control device. For example, the debouncing time may be used to control a change from the first to the second emission characteristic as a function of the brightness deviation.

It is possible with the aid of the approach described above to adapt the debouncing time in such a way that the driver perceives a switchover between the emission characteristics to be as pleasant as possible. The approach described above may be implemented with the aid of simple arrangement, for example, by using a conventional high beam assistant of a vehicle.

In the case of an adaptive high beam assistant which adapts, for example, the headlight distribution (quasi-) continuously to the traffic situation, it is possible, for example, to use the debouncing time to gain influence on the dynamics of the headlight system. In the case of an adaptive headlight system, a signal delay may, for example, be perceived as a slower system response. In the case of an adaptive high beam assistant, the debouncing time may, for example, also be understood to mean a time constant of a controller.

Thus, the approach described above may not only be used for traditional high beam assistants (low beam/high beam), but also for adaptive high beam assistants (e.g., adaptive bright/dark border, vertical bright/dark border, matrix beam).

According to one specific embodiment, the change from the first to the second emission characteristic may be delayed by the debouncing time for the purpose of controlling the at least one headlight. This may, for example, be a change from low beam to high beam. By delaying the change by the debouncing time, it may be achieved that changes which are accompanied by a strong contrast change, e.g., when a brightness of the low beam deviates significantly from a brightness of the high beam, take place less often. In this way, the driver is distracted less.

According to one specific embodiment, a length of the debouncing time may be set proportionally to a magnitude of the brightness deviation. It may be advantageously achieved in this way that in the case of major brightness deviations, fewer switchovers between the emission characteristics tend to take place than in the case of minor brightness deviations. A disturbing influence on the comfort perception of the driver may thus be avoided. In contrast, it is accordingly possible to switch over faster in the case of minor brightness deviations, where a switchover has only a minor influence on the comfort perception, for the purpose of setting a greater visibility range, for example.

According to one specific embodiment, the brightness deviation may be furthermore ascertained by using a piece of surroundings information and/or a piece of weather information. In this case, the surroundings information and/or the weather information may characterize a reflective property of the surroundings of the vehicle. A piece of surroundings or weather information may be, for example, an image signal of a camera which is integrated into the vehicle and which is configured to detect a brightness of the surroundings. For example, the camera may be connected to a device via an interface of the vehicle for controlling the at least one headlight. A piece of surroundings information may be, for example, a reflective property of the surroundings which is influenced by reflective elements such as signs or markings. A piece of weather information may, for example, represent a reflective property of the surroundings which is influenced by different weather conditions such as rain or fog. The surroundings and/or weather information may be advantageously combined with the first and the second brightness signals for the purpose of ascertaining the brightness deviation. In this way, errors may be avoided during the ascertainment of the brightness deviation.

According to one specific embodiment, the debouncing time may be furthermore set by using a piece of time information. Here, the time information may represent a reading-in point in time at which the first brightness signal was read in and/or a reception point in time at which the second brightness signal was received. A piece of time information may be, for example, a time stamp which is generated and stored in the step of reading in and/or in the step of receiving in each case. The longer the reading-in point in time and/or the reception point in time date(s) back, the less accurate may the debouncing time be with regard to an instantaneous point in time. The debouncing time may advantageously be corrected in the step of setting by using the time information in order to prevent an inaccurate debouncing time from being set.

According to one specific embodiment, the step of receiving may be carried out repeatedly in order to receive a plurality of the second brightness signals. In the step of ascertaining, the brightness deviation may be ascertained in this case by using the first brightness signal and the plurality of the second brightness signals. In the step of receiving, the second brightness may, for example, be influenced by a headlight of another vehicle which is oncoming with regard to the vehicle. This may result in errors occurring during the ascertainment of the brightness deviation. Such errors may advantageously be avoided in that another second brightness signal may be received prior to the appearance of the other vehicle in order to ascertain the brightness deviation.

According to one specific embodiment, the first brightness signal may be read in via an interface to a headlight sensor in the step of reading in. Additionally or alternatively, the second brightness signal may be received via the interface to a headlight sensor in the step of receiving. A headlight sensor may, for example, be understood to mean the camera which is integrated into the vehicle or another type of optical sensor which is configured to detect a brightness of the surroundings and to output corresponding signals to the device for controlling the headlight. The headlight sensor may be oriented toward the surroundings of the vehicle. Furthermore, the headlight sensor may be connected to the device via an interface. With the aid of the headlight sensor, the brightness values which are necessary for ascertaining the brightness deviation may be measured reliably and accurately.

According to one specific embodiment, the first brightness signal may be read in the step of reading in via an interface to an estimation device for the purpose of estimating the first brightness by using the second brightness signal. In the step of receiving, the second brightness signal may be received via the interface to the estimation device for the purpose of estimating the second brightness by using the first brightness signal. An estimation device may be, for example, an arithmetic unit of the above-mentioned control device of the vehicle. The estimation device may be connected via an interface to the headlight sensor for the purpose of processing the brightness signals. For example, the estimation device may be configured to compute the first and the second brightnesses in each case with the aid of linear interpolation between the brightnesses. The first and the second brightnesses may be computed particularly rapidly with the aid of the estimation device. In addition, such an estimation device may have particularly small storing requirements.

The present approach furthermore provides a device for controlling at least one headlight of a vehicle, the at least one headlight having a first and a second emission characteristic for illuminating the surroundings of the vehicle, the device including the following features:

a reading-in unit for reading in a first brightness signal, the first brightness signal representing a first brightness, which is assigned to the first emission characteristic, of the surroundings of the vehicle;

a receiving unit for receiving a second brightness signal, the second brightness signal representing a second brightness, which is assigned to the second emission characteristic, of the surroundings of the vehicle;

an ascertaining unit for ascertaining a brightness deviation between the first and the second brightnesses by using the first and the second brightness signals; and a setting unit for setting a debouncing time for changing from the first to the second emission characteristic as a function of the brightness deviation.

In the present case, a device may be understood to mean an electrical device which processes sensor signals and outputs control and/or data signals as a function thereof. The device may have interfaces which may be configured as hard- and/or software. In the case of a hardware configuration, the interfaces may, for example, be a part of a so-called system ASIC, which includes various functions of the device. It is, however, also possible that the interfaces are independent, integrated circuits or are at least partially made of discrete components. In the case of a software configuration, the interfaces may be software modules which are present on a microcontroller next to other software modules, for example. A reading in, receiving, ascertaining, and setting unit may furthermore be understood to mean a control device which processes sensor signals and outputs control and/or data signals as a function thereof. The object underlying the present approach may be achieved rapidly and efficiently with the aid of the device.

A computer program product having program code is also advantageous, which may be stored on a machine-readable carrier, such as a semiconductor memory, a hard disk memory, or an optical memory, and is used for carrying out the method according to one of the specific embodiments described above, when the program product is executed on a computer or a device.

The present invention is elucidated below in greater detail, as an example, on the basis of the appended drawings.

DETAILED DESCRIPTION

Figure 1:
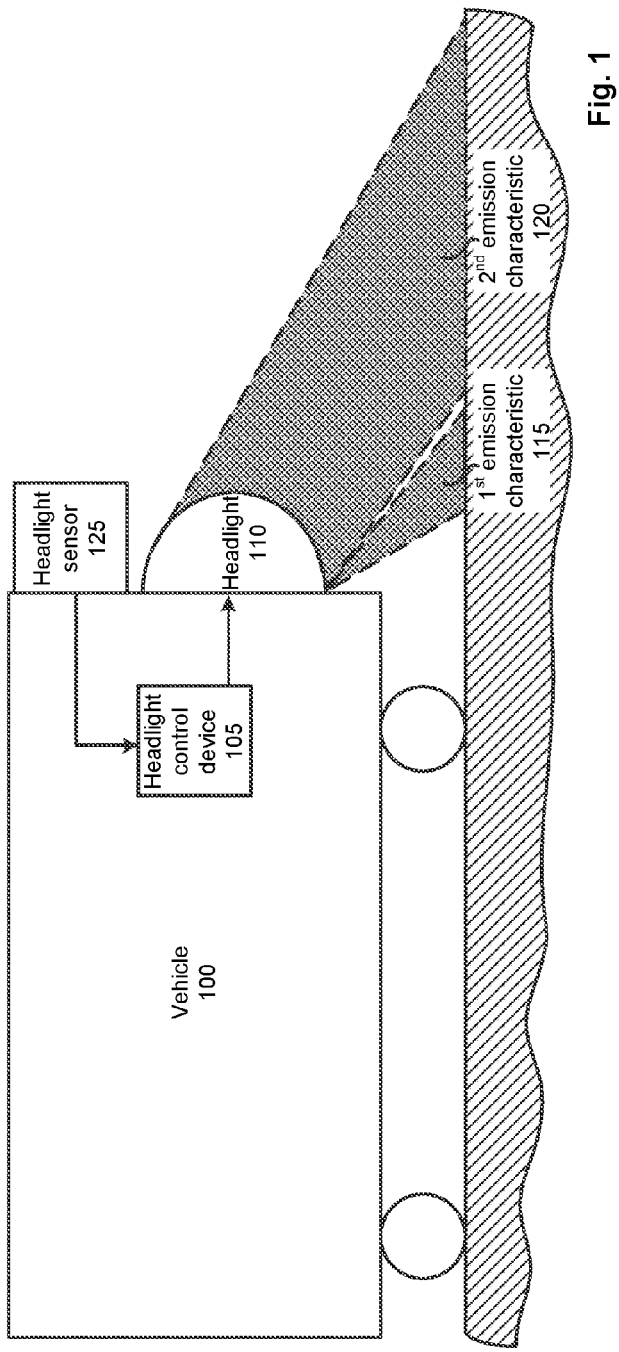
FIG. 1 shows a schematic representation of a vehicle having a device for controlling at least one headlight of the vehicle according to one exemplary embodiment of the present invention.

In the following description of advantageous exemplary embodiments of the present invention, the elements which are illustrated in the various figures and appear to be similar are identified with identical or similar reference numerals; a repetitive description of these elements is dispensed with.

FIG. 1 shows a schematic representation of a vehicle 100 having a device 105 for controlling at least one headlight 110 of vehicle 100 according to one exemplary embodiment of the present invention.

Vehicle 100 has device 105. Device 105 may be, for example, a component of an adaptive high beam assistant of vehicle 100. Furthermore, vehicle 100 has headlight 110. Headlight 110 is situated in such a way that it is able to illuminate the surroundings of vehicle 100, an area ahead of vehicle 100 in the present case. Headlight 110 has a first emission characteristic 115 and a second emission characteristic 120. For example, first emission characteristic 115 may correspond to a low beam of vehicle 100 and second emission characteristic 120 may correspond to a high beam of vehicle 100. Headlight 110 may be switched over between first emission characteristic 115 and second emission characteristic 120.

Device 105 is, for example, connected to headlight 110 via a bus system of vehicle 100 in order to control headlight 110. Device 105 is configured to detect a particular brightness of emission characteristics 115, 120 and to ascertain a brightness difference between emission characteristics 115, 120 by using the particular brightnesses. Device 105 is furthermore configured to set a time delay for switching over headlight 110 as a function of the brightness difference. Optionally, device 105 may be configured to switch over headlight 110 between emission characteristics 115, 120 in a time-delayed manner. According to this exemplary embodiment, device 105 may have an interface to an optional headlight sensor 125. Optional headlight sensor 125 may be, for example, a camera, which is integrated into vehicle 100, for detecting the surroundings of vehicle 100. Optional headlight sensor 125 may be oriented to the area ahead of vehicle 100 and be configured to detect the particular brightness of emission characteristics 115, 120. The optional sensor may be, for example, connected via the bus system of vehicle 100 to device 105 for reading in corresponding signals.

Figure 2:
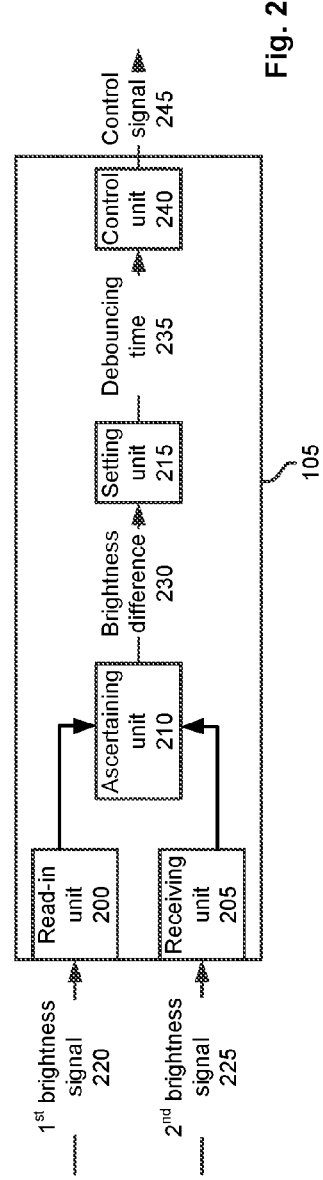
FIG. 2 shows a schematic representation of a device for controlling at least one headlight of a vehicle according to one exemplary embodiment of the present invention.

FIG. 2 shows a schematic representation of a device 105 for controlling at least one headlight of a vehicle according to one exemplary embodiment of the present invention. Device 105 may be device 105 illustrated in FIG. 1. Device 105 has a reading-in unit 200, a receiving unit 205, an ascertaining unit 210, and a setting unit 215.

Reading-in unit 200 is configured to read in a first brightness signal 220. Here, first brightness signal 220 represents a first brightness, which is assigned to the first emission characteristic, of the surroundings of the vehicle shown in FIG. 1. Receiving unit 205 is configured to read in a second brightness signal 225. Here, second brightness signal 225 represents a second brightness, which is assigned to the second emission characteristic, of the surroundings of the vehicle shown in FIG. 1. According to the exemplary embodiment shown in FIG. 1, brightness signals 220, 225 may be read in or received optionally via an interface to a headlight sensor, e.g., the bus system of the vehicle.

Reading-in unit 200 and receiving unit 205 are each connected to ascertaining unit 210. Reading-in unit 200 may output first brightness signal 220. Receiving unit 205 may output second brightness signal 225. Ascertaining unit 210 may receive brightness signals 220, 225. Ascertaining unit 210 is configured to ascertain a brightness deviation 230 between the first and the second brightnesses by using brightness signals 220, 225.

Ascertaining unit 210 is connected to setting unit 215. Ascertaining unit 210 may output brightness deviation 230 in the form of a corresponding signal, for example. Setting unit 215 may receive brightness difference 230. Setting unit 215 is configured to set a debouncing time 235 for the change from the first emission characteristic to the second emission characteristic as a function of brightness deviation 230. Here, a length of debouncing time 235 may be set proportionally to a magnitude of brightness deviation 230 according to one exemplary embodiment of the present invention.

According to one exemplary embodiment of the present invention, device 105 may optionally have a control unit 240 for controlling the headlight shown in FIG. 1. Control unit 240 may be connected to setting unit 215. Furthermore, control unit 240 may be connected to the headlight via the bus system of the vehicle, for example. Setting unit 215 may output debouncing time 235 in the form of a corresponding signal, for example. Control unit 240 may receive debouncing time 235. Control unit 240 may be configured to provide a control signal 245 after debouncing time 235 has elapsed. The headlight may receive control signal 245. The headlight may be configured to switch over from the first emission characteristic to the second emission characteristic in response to control signal 245, for example. This may be a turning up of the headlight, for example.

Figure 3:
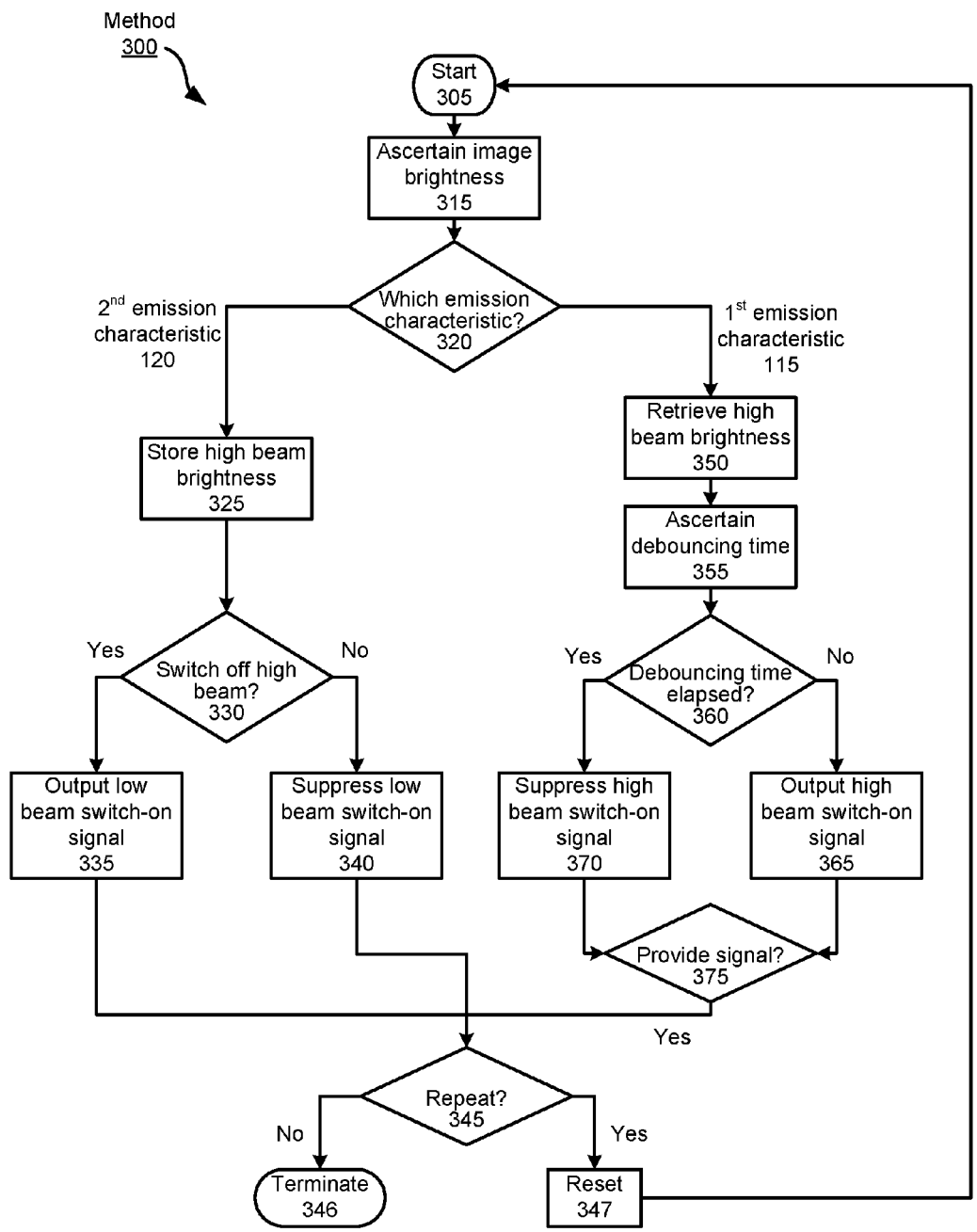
FIG. 3 shows a flow chart of a method for controlling at least one headlight of a vehicle according to one exemplary embodiment of the present invention.

FIG. 3 shows a flow chart of a method 300 for controlling at least one headlight of a vehicle according to one exemplary embodiment of the present invention. Method 300 may, for example, be carried out with the aid of the device, which is described in FIG. 2, for controlling at least one headlight of a vehicle. Method 300 starts with a step 305 of activating the device. For example, the device may be activated by switching on the at least one headlight. As has been already described in the previous figures, the at least one headlight may have a first emission characteristic 115, e.g., a low beam, and a second emission characteristic 120, e.g., a high beam.

In response to step 305, an instantaneous image brightness of an image of the surroundings of the vehicle, which are illuminated by the at least one headlight, is ascertained. In a further step 320, a decision is made with regard to an instantaneous headlight setting of the at least one headlight. The instantaneous headlight setting may be one of the two emission characteristics 115, 120.

If in step 320 the decision is made that the instantaneous headlight setting corresponds to the high beam, a high beam image brightness is stored in a step 325. In response to storing the high beam image brightness, a decision is made in a step 330 with regard to switching off the high beam. The decision with regard to switching off may, for example, be a function of a traffic situation or a velocity of the vehicle. If, in step 330, the decision is made that the high beam should be switched off due to an oncoming vehicle, for example, a low beam switching-on signal may be output in a step 335 to the at least one headlight for the purpose of switching over of the at least one headlight from high beam to low beam. If, however, the decision is made in step 330 that the high beam should be kept, an output of the low beam switching-on signal to the at least one headlight may be suppressed in a step 340.

In response to steps 335, 340, a decision with regard to a repetition of method 300 may be made in a further step 345, for example, in order to store again the high beam image brightness as a function of changed surroundings of the vehicle. If it occurs in step 345 that method 300 should be terminated, e.g., when the at least one headlight of the vehicle is switched off, method 300 is terminated with a step 346 of switching off device 105 or an at least temporary discontinuation of method 300. If, however, it occurs in step 345 that method 300 should be repeated, device 105 may be reset in a step 347 to step 315 of ascertaining the instantaneous image brightness in order to carry out method 300 one more time.

If it occurs in step 320 of deciding on the instantaneous headlight setting that the instantaneous headlight setting corresponds to the low beam, the high beam image brightness which was stored in step 325 is retrieved in a step 350. By using the high beam image brightness and the instantaneous image brightness, in the present case a low beam image brightness, which was ascertained in step 315, it is possible to ascertain a debouncing time in a step 355 for delaying the switchover from low beam to high beam. The debouncing time is in this case ascertained as a function of a difference between the instantaneous image brightness and the high beam image brightness. In response to step 355, a decision is made in a step 360 with regard to an elapsing of the debouncing time by using the debouncing time. If it occurs in step 360 that the debouncing time has elapsed, a high beam switching-on signal for switching over from low beam to high beam may be output to the at least one headlight in a step 365. If, however, the decision is made in step 360 that the debouncing time has not yet elapsed, an output of the high beam switching-on signal to the at least one headlight may be suppressed in a step 370. In response to steps 365, 370, a step 375 of providing a signal for carrying out step 345 is carried out. In response to this signal, step 345 of deciding on a repetition of method 300 is carried out.

One exemplary embodiment of the present invention is described in the following based on FIGS. 1 through 3.

With the aid of a device 105, an adaptation of debouncing times to a brightness difference between a low beam and a high beam of a vehicle 100, for example, may be carried out. In this case, the low beam and the high beam are only two exemplary light distributions which are possible in the case of adaptive systems. Generally put, a separate brightness signal may be stored for any light distribution, any emission angle, etc. This is important, in particular, since in the case of adaptive systems, the switchover to low beam takes place considerably later or not at all. According to the above-described approach, the brightness may also be stored in intermediate stages or different light distributions or headlight configurations in the case of an adaptive system.

Device 105 may be a part of an adaptive high beam assistant, for example. Adaptive high beam assistants may continuously control a headlight beam between low beam and high beam (AHC=adaptive headlight control, also known as aHDG=adaptive bright/dark border). In addition, adaptive high beam assistants may generate a shadow corridor for other road users, which is also known as anti-glare high beam (CHC=continuous headlight control, also known as vHDG=vertical bright/dark border) or matrix beam. Adaptive high beam assistants may use different controller parameters, e.g., debouncing time 235, in a control of a headlight 110 in order to adapt a dynamic to the activation. Such an adaptation may be implemented as a function of a situation of vehicle 100. A fast reaction in the event of oncoming traffic or a slow reaction in the case of preceding traffic may take place, for example.

In adaptive high beam assistants, the adaptation of debouncing times may also be carried out, in particular, to other emission characteristics of the headlights such as to intermediate values between low beam and high beam, since low beam, in particular, is set less often in adaptive systems than in conventional high beam assistants. This makes an even more accurate adaptation of the debouncing time possible.

In order to adapt debouncing time 235, a brightness of the high beam is stored and compared to a brightness of the low beam. The high beam may be second emission characteristic 120 and the low beam may be first emission characteristic 115. If a great difference, also referred to as brightness deviation 230, is established between a stored high beam brightness and an instantaneous low beam brightness, a longer debouncing time 235 may be selected. If a small difference is established, a shorter debouncing time 235 may be selected. The low beam brightness may also be referred to as the first brightness; the stored high beam brightness may also be referred to as the second brightness. A time factor may also be used instead of debouncing time 235 in order to control headlight 110. Vehicle 100 may, for example, have a camera as a headlight sensor 125 for the purpose of detecting the brightness. After another vehicle has disappeared from the image of the camera, the turning up of the headlight is prevented until debouncing time 235 has elapsed.

After vehicle 100 has dimmed the headlight again, the properties of the surroundings of vehicle 100 may change. This may have consequences for the image brightness. If, for example, a strongly reflective sign was seen in the image of the camera prior to dimming the headlights, the average image brightness is greater than without the sign. If vehicle 100 drives past the sign, the average image brightness is also lower with the low beam than at a point in time prior to driving past the sign. Consequently, debouncing time 235 which is set according to the great brightness difference may be too long. Due to the understanding of the situation by the camera, such a sign may be taken into consideration when ascertaining the image brightness, e.g., by storing an appropriate sign marking, also referred to as sign flag, or by leaving out an area of the sign when ascertaining the image brightness. The setting of debouncing time 235 may be improved by incorporating such a piece of surroundings information.

According to one exemplary embodiment of the present invention, the camera may be configured to recognize rain. In the case of rain or wetness, the reflection degree of the road changes. Thus, the road may appear darker and a headlight distribution of emission characteristics 115, 120 may change. If the camera recognizes rain and a high beam illumination was ascertained for a dry roadway, a stored brightness may be adapted with the aid of weather information. The ascertainment of debouncing time 235 may thus be improved.

According to one exemplary embodiment of the present invention, a presence of ground vegetation and buildings or the changes resulting therefrom may be estimated by using data of a navigation device. The data of the navigation device may be read in via an interface to device 105, for example. The reading in of such data may be particularly advantageous in the case of poor visibility and an obsolete or old high beam brightness which was ascertained a while ago.

In addition to the brightness and other attributes, such as signs in the image of the camera, an age of the ascertained high beam brightness may be stored in the form of a time stamp, for example, according to one exemplary embodiment of the present invention. The older the stored high beam brightness is, the less accurate may the information be regarding brightness deviation 230. Accordingly, a less strong change in debouncing time 235 may be selected in the case of old high beam brightnesses in order to make the driver feel comfortable.

According to one exemplary embodiment of the present invention, other high beam assistants such as adaptive high beam control or AHC (gliding headlight range) may also be provided with information regarding a brightness. For example, it may be estimated how great a brightness will be in the image by evaluating row sums. Instead of the high beam, which illuminates an entire image scene, only half of the emission area of headlight 110 may be used, for example, in order to determine the entire brightness with the aid of the row sum. In this way, the image brightness may be computed accurately, thus proving advantageous, in particular in the case of inhomogeneous image contents.

In one exemplary embodiment of the present invention, the image brightness may be alternatively or additionally interpolated linearly between low beam and high beam by comparing the brightnesses to one another. A corresponding interpolation device may advantageously have a small storage consumption and a great computing power.

Advantageously, the step of ascertaining the high beam brightness may be carried out repeatedly according to one exemplary embodiment of the present invention. For this purpose, multiple images may be consecutively recorded by the camera of vehicle 100. For example, a headlight beam of another vehicle may be visible in the visual field of the driver even prior to a complete appearance of the other vehicle. If a brightness of the headlight beam of the other vehicle is ascertained prior to the complete appearance of the other vehicle, debouncing time 235 may be subsequently ascertained more accurately by using this brightness.

Figure 4:
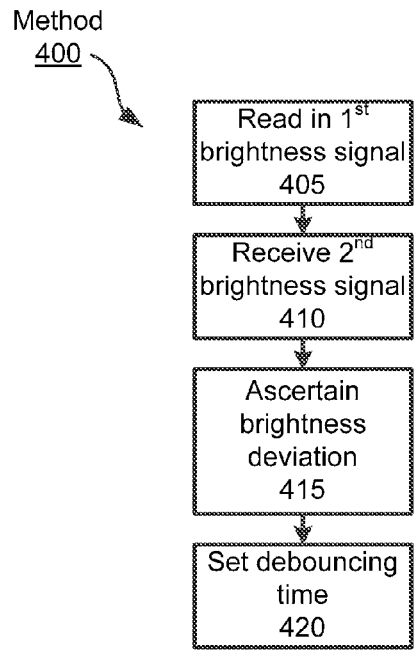
FIG. 4 shows a flow chart of a method for controlling at least one headlight of a vehicle according to one exemplary embodiment of the present invention.

FIG. 4 shows a flow chart of a method 400 for controlling at least one headlight of a vehicle according to one exemplary embodiment of the present invention. Here, the at least one headlight has a first and a second emission characteristic for illuminating the surroundings of the vehicle. In a step 405, a first brightness signal is read in. In this case, the first brightness signal represents a first brightness, which is assigned to the first emission characteristic, of the surroundings of the vehicle. In a step 410, a second brightness signal is received. In this case, the second brightness signal represents a second brightness, which is assigned to the second emission characteristic, of the surroundings of the vehicle. In a step 415, a brightness deviation is ascertained between the first and the second brightnesses by using the first and the second brightness signals. Finally, a debouncing time is set in a step 420 for changing from the first to the second emission characteristic as a function of the brightness deviation.

Figure 5:
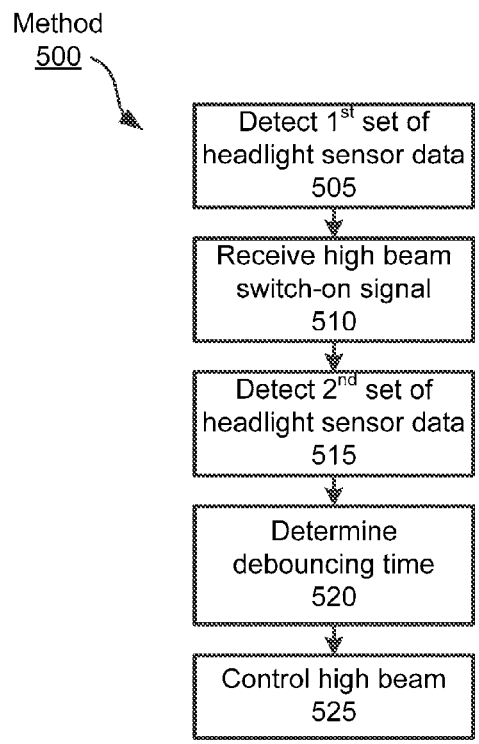
FIG. 5 shows a flow chart of a method for operating a high beam of a motor vehicle according to one exemplary embodiment of the present invention.

FIG. 5 shows a flow chart of a method 500 for operating a high beam of a motor vehicle according to one exemplary embodiment of the present invention. The method includes a step 505 of detecting the first set of sensor data of a headlight sensor when the high beam is operated. Here, the first set of sensor data represents a high beam brightness. In a further step 510, a control signal for switching on the high beam is received. In response to the reception of the control signal, a second set of sensor data of the headlight sensor is detected in a step 515. Here, the second set of sensor data represents an image brightness which was ascertained prior to switching on the high beam, a low beam brightness, for example. In a further step 520, a debouncing time is determined as a function of the first and the second sets of sensor data. Finally, a step 525 of controlling the high beam as a function of the debouncing time takes place.

The exemplary embodiments described and shown in the figures have only been selected as examples. Different exemplary embodiments may be combined with each other in their entirety or with regard to their individual characteristics. Also, one exemplary embodiment may be supplemented with characteristics of another exemplary embodiment. Furthermore, method steps according to the present invention may be repeated and executed in a sequence different from the one described.

If an exemplary embodiment includes an "and/or" link between a first characteristic and a second characteristic, this should be read in such a way that the exemplary embodiment according to one specific embodiment has both the first characteristic and the second characteristic and according to another specific embodiment it has either only the first characteristic or only the second characteristic.

What is claimed is:

1. A method for controlling at least one headlight of a vehicle, the method comprising the steps of:
   reading in a first brightness signal, the first brightness signal representing a first brightness, which is assigned to a first emission characteristic of the at least one headlight for illuminating the surroundings of the vehicle, of the surroundings of the vehicle;
   receiving a second brightness signal, the second brightness signal representing a second brightness, which is assigned to a second emission characteristic of the at least one headlight for illuminating the surroundings of the vehicle, of the surroundings of the vehicle;
   ascertaining a brightness deviation between the first and the second brightnesses by using the first brightness signal and the second brightness signal; and
   setting a debouncing time for changing from the first emission characteristic to the second emission characteristic as a function of the brightness deviation.

2. The method of claim 1, further comprising the step of:
   delaying the change from the first emission characteristic to the second emission characteristic by the debouncing time for controlling the at least one headlight.

3. The method of claim 1, wherein, in the setting, a length of the debouncing time is set proportionally to a magnitude of the brightness deviation.

4. The method of claim 1, wherein, in the ascertaining, the brightness deviation is further ascertained by using at least one of a piece of surroundings information and a piece of weather information, the at least one of the piece of surroundings information and piece of weather information characterizing a reflective property of the surroundings of the vehicle.

5. The method of claim 1, wherein, in the setting, the debouncing time is further set by using a piece of time information, the time information representing at least one of a reading-in point in time at which the first brightness signal was read in and a reception point in time at which the second brightness signal was received.

6. The method of claim 1, wherein the receiving is carried out repeatedly to receive a plurality of the second brightness signals, and, in the ascertaining, the brightness deviation is ascertained by using the first brightness signal and the plurality of the second brightness signals.

7. The method of claim 1, wherein at least one of:
   in the reading in, the first brightness signal is read in via an interface to a headlight sensor; and
   in the receiving, the second brightness signal is received via the interface to the headlight sensor.

8. The method of claim 1, wherein, in the reading in, the first brightness signal is read in via an interface to an estimation device for estimating the first brightness by using the second brightness signal, and, in the receiving, the second brightness signal is received via the interface to the estimation device for estimating the second brightness by using the first brightness signal.

9. A device for controlling at least one headlight of a vehicle, comprising:
   a reading-in unit for reading in a first brightness signal, the first brightness signal representing a first brightness, which is assigned to a first emission characteristic for illuminating the surroundings of the vehicle, of the surroundings of the vehicle;
   a receiving unit for receiving a second brightness signal, the second brightness signal representing a second brightness, which is assigned to a second emission characteristic for illuminating the surroundings of the vehicle, of the surroundings of the vehicle;
   an ascertaining unit for ascertaining a brightness deviation between the first and the second brightnesses by using the first brightness signal and the second brightness signal; and
   a setting unit for setting a debouncing time for changing from the first emission characteristic to the second emission characteristic as a function of the brightness deviation.

10. A non-transitory computer readable medium having a computer program, which is executable by a processor, comprising:
   a program code arrangement having program code for controlling at least one headlight of a vehicle, by performing the following steps:
      reading in a first brightness signal, the first brightness signal representing a first brightness, which is assigned to a first emission characteristic of the at least one headlight for illuminating the surroundings of the vehicle, of the surroundings of the vehicle;
      receiving a second brightness signal, the second brightness signal representing a second brightness, which is assigned to a second emission characteristic of the at least one headlight for illuminating the surroundings of the vehicle, of the surroundings of the vehicle;
      ascertaining a brightness deviation between the first and the second brightnesses by using the first brightness signal and the second brightness signal; and
      setting a debouncing time for changing from the first emission characteristic to the second emission characteristic as a function of the brightness deviation.

* * * * *